United States Patent [19]

Dutta et al.

[11] Patent Number: 5,323,019

[45] Date of Patent: Jun. 21, 1994

[54] ALL OPTICAL MULTIPLE QUANTUM WELL OPTICAL MODULATOR

[75] Inventors: Mitra Dutta, Matawan; Hongen Shen, Howell, both of N.J.

[73] Assignee: The United States of America as represented by the Secretary of the Army, Washington, D.C.

[21] Appl. No.: 52,408

[22] Filed: Apr. 20, 1993

[51] Int. Cl.$^5$ .............................................. H01L 27/14
[52] U.S. Cl. ........................................ 257/17; 257/21; 257/22; 257/82; 257/85; 359/246; 359/248
[58] Field of Search ..................... 257/458, 21, 17, 82, 257/80, 22, 84, 85; 359/245, 248, 246; 250/214 R

[56] References Cited

U.S. PATENT DOCUMENTS

| | | | |
|---|---|---|---|
| 4,546,244 | 10/1985 | Miller | 372/46 X |
| 4,716,449 | 12/1987 | Miller | 257/21 |
| 4,904,859 | 2/1990 | Goosen et al. | 250/214 R |
| 5,105,301 | 4/1992 | Campi | 359/248 X |
| 5,225,692 | 7/1993 | Takeuchi et al. | 257/21 X |

OTHER PUBLICATIONS

D. A. B. Miller et al, Physics Review B, vol. 32, No. 2, 15 Jul. 1985, "Electric Field Dependence of Optical Absorption Near the Bandgap of Quantum-Well Structures," pp. 1043–1060.

D. A. B. Miller, "Optoelectronic Applications of Quantum Wells," Optics & Photonics News, Feb. 1990, pp. 7–15.

Primary Examiner—William Mintel
Attorney, Agent, or Firm—Michael Zelenka; William H. Anderson

[57] ABSTRACT

A multiple quantum well optical modulator comprising a multiple quantum well structure embedded in the intrinsic region of an s-i-n+ semiconductor. The s-i-n+ structure causes an electric field to be applied to the multiple quantum well structure which causes uncoupling of the el energy confined level of one layer and the x level of the adjacent layer, thereby changing the absorption of the light and causing modulation thereof.

6 Claims, 2 Drawing Sheets

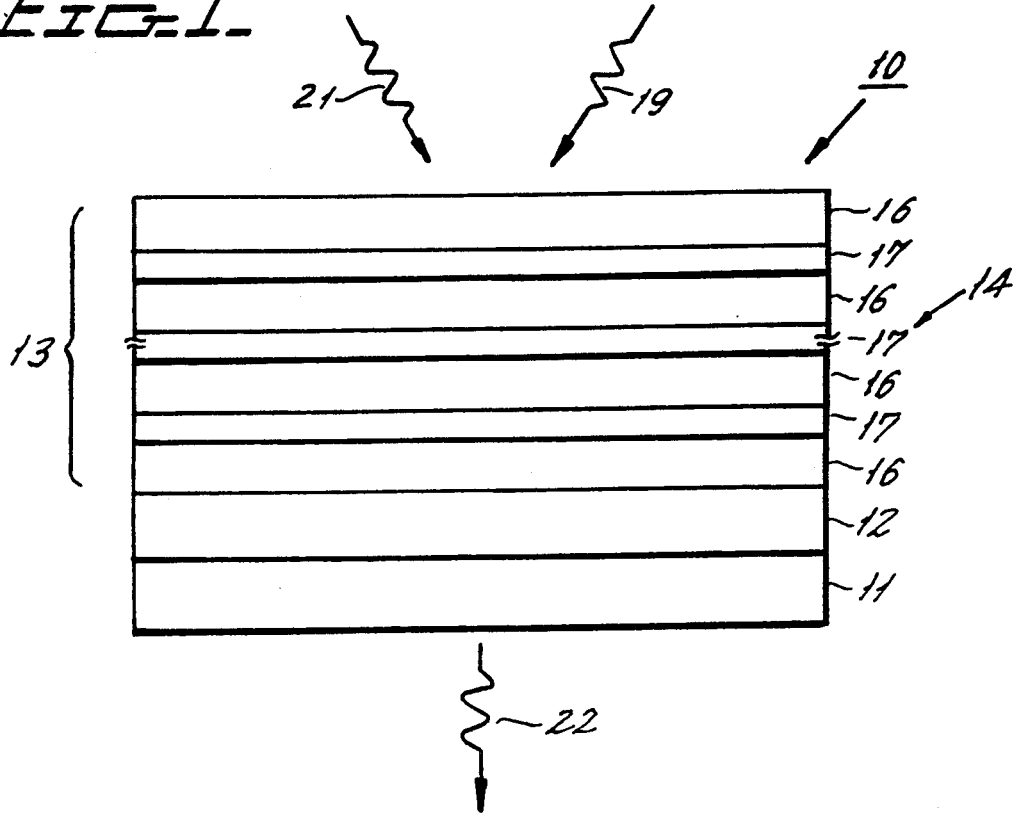
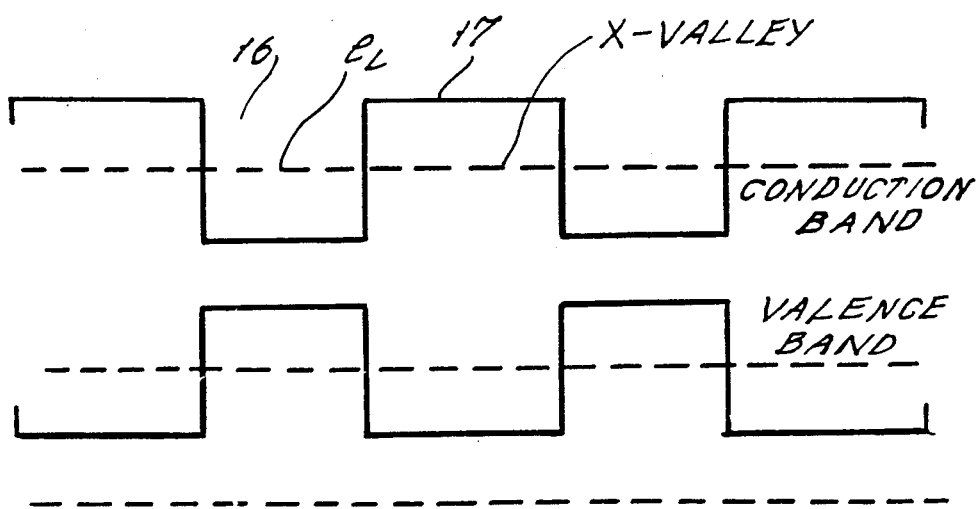

ALL OPTICAL MULTIPLE QUANTUM WELL OPTICAL MODULATOR

GOVERNMENT INTEREST

The invention described herein may be manufactured, used and licensed by or for the Government of the United States of America for governmental purposes without the payment to us of any royalty thereon.

FIELD OF THE INVENTION

The present invention relates to optical modulators and, more particularly, to multiple quantum well optical modulators.

BACKGROUND OF THE INVENTION

Multiple quantum wells are semiconductor structures comprised of alternating thin layers of two different semiconductor materials and, in particular, of semiconductor materials having differing bandgaps. Typically, layer thicknesses are of the order of 100 Angstroms and a typical structure might comprise 100 such layers, resulting in a total thickness of about 1 micrometer. Multiple quantum well structures are typically produced using well known epitaxy techniques, such as molecular beam epitaxy or metal-organic chemical vapor deposition sometimes known as organometallic vapor phase epitaxy. Multiple quantum well structures have been used successfully in many different optical devices, such as optical modulators.

The quantum confined Stark effect (QCSE) has given rise to several innovations in electro-optic modulators. Such modulators have many applications in communications and special purpose computer systems. The principals behind the QCSE have been more fully explained by D. A. B. Miller et al, in Physics Review, 1985, B32, p1043. Briefly though, the QCSE is a phenomenon which arises when an electric field is applied across the plane of heterostructure superlattices. In a quantum well at zero electric field, the electron and hole energy levels are defined by the well width, and the electrons and holes are strongly confined in the well layer. However, when an electric field is applied, the electrons and holes are moved apart and their energies are altered. This has the effect of shifting the absorption resonance to lower energy as well as modulating the strength of the absorption. This occurs because direct optical absorption of a photon above the band gap energy involves raising an electron from one of the valence bands and putting it in the conduction band, otherwise known as formation of an electron-hole pair. This shift in the absorption resonance, then, provides for the optical modulation of any radiation that is incident to the heterostructure.

A typical structure for an such an optical modulator, also known as a quantum confined Stark effect (QCSE) modulator, is a p-i-n diode with the multiple quantum well structure formed within the intrinsic layer of the diode, i.e., the "i" region. In operation, a light beam is either directed perpendicular to the multiple quantum well layers or in the plane of the layers in a waveguide configuration, while at the same time a reverse bias is applied to the diode. Modulation of the lightbeam is effected by varying the reverse bias. An example of such a device is found in U.S. Pat. No. 5,105,301, issued on Apr. 14, 1992 to Campi and entitled, "Coupled Quantum Well Electro-optical Modulator."

In lieu of an electrically controlled multiple quantum well optical modulator, optical control may be employed. One such device, known as the self electro-optic effect device (SEED), essentially combines a multiple quantum well modulator with a photo detector. The photo detector generates the necessary electric field to change the absorption band of the multiple quantum well structure.

Examples of both electrically controlled and optically controlled multiple quantum well devices can also be found in an article by D. A. B. Miller, "Optoelectronic applications of quantum wells," *Optics & Photonics News*, vol. 1, no. 2, page 7, February 1990; U.S. Pat. No. 4,546,244, issued in October, 1985 to Miller; and U.S. Pat. No. 4,904,859, issued on Feb. 27, 1990 to Goossen et al and entitled, Self Electro-optic Effect Device Employing Asymmetric Quantum Wells."

SUMMARY OF THE INVENTION

The object of the present invention is to provide an all optical multiple quantum well optical modulator which functions without the need of an external electric field.

The foregoing and other objects are achieved in accordance with the present invention by imbedding a multiple quantum well (MQW) structure, such as SEE device, in a layer of a semiconductor device in which the internal electric field strength is a function of incident light.

Preferably, the MQW structure is imbedded in the intrinsic region of an S-i-n+ (surface-intrinsic-n+doped semiconductor) device. The S-i-n+ device provides for a built in electric field, the intensity of which will depend on the intensity of incident light. Thus, the electric field experienced by the electrons in the multiple quantum well structure can be varied by the intensity of the light on the structure. This, in turn, will affect the intensity (or amount) of light that can be absorbed by the MQW structure and hence enables modulation of the light absorbed by the entire structure.

BRIEF DESCRIPTION OF THE DRAWINGS

These and other features of the invention will be more readily understood in light of the Detailed Description of the Invention and the Figures wherein like numerals reference similar elements of the invention and wherein:

FIG. 1 is a diagrammatic cross sectional view of an all optical multiple quantum well modulator illustrating certain principles of the present invention.

FIG. 2 is a schematic bandgap diagram of a multiple quantum well structure at zero electric field.

Figure 3:
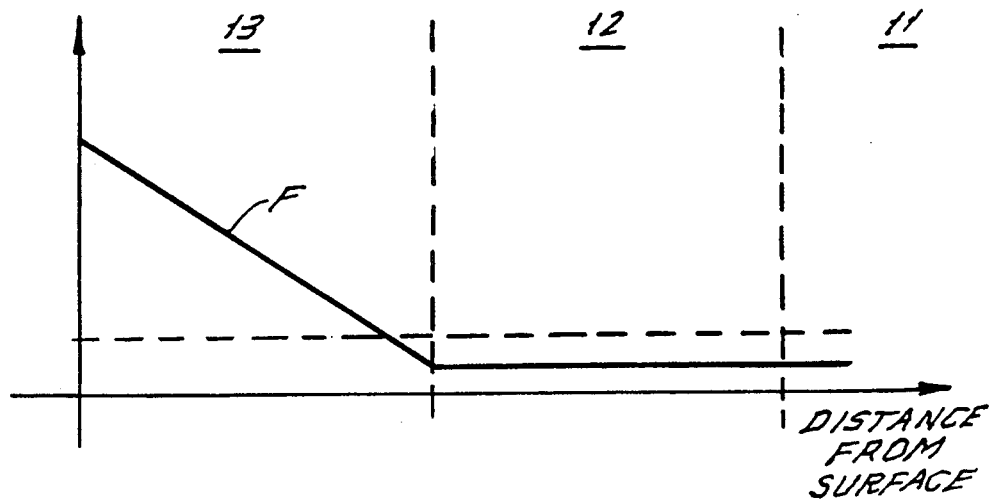
FIG. 3 is a schematic of an electric field diagram associated with the SIN+ structure.

The exemplary embodiment of the invention illustrated in the Figures have not been drawn to scale and are merely for purposes of illustrating the layering of the semiconductor materials. Examples of the widths of the quantum wells and barriers are given in the text of the Detailed Description.

DETAILED DESCRIPTION OF THE INVENTION

Referring now to the drawings and in particular to FIG. 1, there is shown an all optical multiple quantum well modulator 10 embodying certain principles of the present invention. The modulator 10 includes an n+ substrate 11, an n+ layer 12 over the substrate 11 and an intrinsic layer 13 above the n+ layer 12. A multiple quantum well structure (MQW) 14 is embedded within the intrinsic layer 13. The MQW structure 14 is comprised of alternating quantum well and barrier layers 16 and 17 of materials having differing bandgaps.

Preferably, the substrate is gallium arsenide (GaAs) with a (100) orientation, the layer 12 is 500 Å thick and is composed of n+ doped GaAs, the intrinsic layer 13 is 1000–10,000 Å thick and is comprised of undoped GaAs. The quantum well layers 16 are each composed of GaAs and are 35–40 Å thick, and the quantum barrier layers 17 are comprised of aluminum arsenide (AlAs) and are each 40–70 Å thick. In a typical structure according to the present invention, there may be 20–100 Å quantum well layers 16 and 20–100 quantum barrier layers 17.

The thicknesses of the alternating quantum well layers 16 and quantum barrier layers 17 are chosen such that at zero electric field, as shown in FIG. 2, the el confined electron levels of the quantum well layer 16 are near in energy to the x-valleys (the nearest energy level) of the quantum barrier layers 17, thereby forming indirect bandgaps between adjacent quantum well and barrier layers. As those skilled in the art will know, the x-valley energy level refers to the lowest energy derived from the indirect bandgap relation between the energy bands of GaAs and AlAs when GaAs and AlAs are layered as explained above. When an electric field is applied, the energy levels of the quantum well layers 16 are then decoupled from adjacent quantum wells and thus, the el energy level of the quantum wells 16 is strongly confined. This decoupling or shifting of the energy levels alters the absorption resonance of the structure, as explained in the Background of the Invention. Because of the nature of the Γ-X valley coupling, small electric fields (e.g., $10^4$ V/cm) are sufficient to significantly alter the absorption. (The Γ-valley refers to the lowest energy level formed by the direct gap relation of the valence and conduction bands between the GaAs and AlAs layers.) A multiple quantum well structure of the foregoing type may be found in U.S. Pat. No. 5,208,695 issued to Mitra Dutta entitled "OPTICAL MODULATOR BASED ON Γ-X VALLEY MIXING IN GaAs-AlAs," Ser. No. 07/765,215 filed Sep. 20, 1991 and assigned to the same assignee as this application, the disclosure of which is hereby incorporated by reference.

Figure 4:
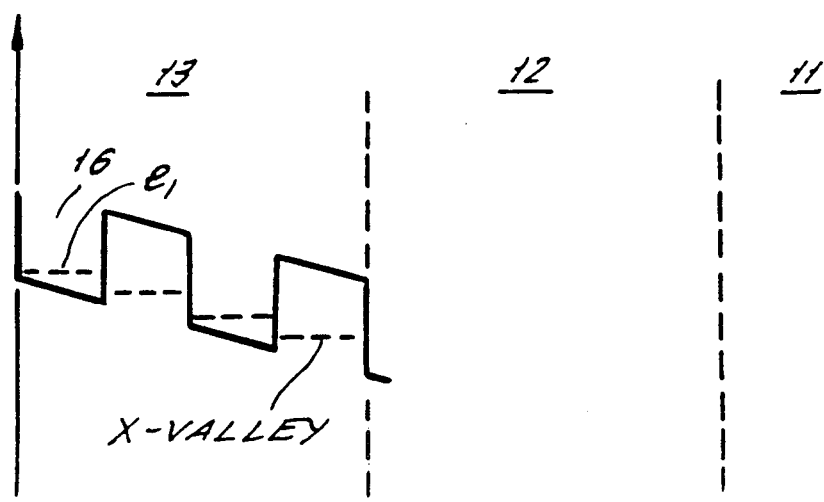
FIG. 4 is a schematic bandgap diagram of the multiple quantum well modulator of FIG. 1.

In accordance with the present invention, the decoupling is effected by an internal electric field generated by the S-i-n+ structure. More specifically, as seen in FIG. 3, in accordance with the present invention, a field F extends from the surface layer 13 through the intrinsic layer 13. This field can be as strong as $10^4 - 10^5$ V/cm; therefore, no external field is necessary. As those skilled in the art will readily appreciate from the dimensions given above, the fermi level of the n+ doped layer 11 is pinned at 0 eV whereas in the surface layer 13, the fermi level is pinned at 0.7 eV. Thus, an electrical potential difference is established creating the field F. Therefore, as depicted in FIG. 4 and as explained by reference to the above mentioned application, the electric field F causes a decoupling of the el confined electron level of the quantum well layers 16 from the x-valleys of the adjacent quantum barrier layers 17, thereby strongly confining the energy levels in the adjacent quantum well layers 16 of the heterostructure.

In operation, a signal light beam 19 is directed onto the surface of the modulator 10. A control light beam 21 is also directed onto the surface 18 of the modulator 10. As those skilled in the art will readily recognize, a photovoltaic effect induced by the control beam 21 causes a reduction in the magnitude of the field F due to a reduction in the differences between the potential voltages at which the fermi levels of the surface and n+ doped layers are pinned. This, in turn, brings the el and x-valley energy levels closer together, thereby resulting in greater coupling between the el and the x-valley energy levels and thus, leading to less absorption of light at the wavelength of the light 19 and modulation of an output light beam 21.

The ability to affect the absorption of light by the modulator 10 by varying the internal electric field F by the control beam 21 provides an optical modulator which functions without the necessity of an external electric field thus making possible an all optical modulator.

Although the present invention has been described in relation to a particular embodiments thereof, many other variations and modifications and other uses will become apparent to those skilled in the art. For example, although the all optical multiple quantum well modulator 10 has been described as having a particular multiple quantum well embedded in its intrinsic region, as will now be appreciated by those skilled in the art, any multiple quantum well structure, such as the SEE devices referenced in the Background of the Invention, may be embedded in the intrinsic region in accordance with the present invention. Moreover, those skilled in the art will also readily appreciate that the materials and dimensions described in this preferred embodiment may also be engineered to fulfill the intent of the invention. It is preferred, therefore, that the present invention be limited not by the specific disclosure herein, but only by the appended claims.

What is claimed is:
1. An optical modulator comprising:
a control light source which can vary in intensity;
a signal light source;
at least one semiconductor layer having a Fermi level pinned at a predetermined voltage potential; and
a multiple quantum well structure formed as an intrinsic layer over the at least one semiconductor layer, the multiple quantum well structure having a Fermi level which is pinned at a predetermined voltage potential which is different than the Fermi level of the at least one semiconductor layer such that an internal electric field is established within the optic modulator and the multiple quantum well structure being fabricated such that variations in the magnitude of the internal electric field caused by the control light source will alter the absorption of the signal light in the multiple quantum well.

2. An optical modulator according to claim 1, wherein the at least one semiconductor layer is an n+ layer.

3. An optical modulator in accordance with claim 2, wherein the multiple quantum well structure comprises multiple alternating layers of gallium arsenide (GaAs) and aluminum arsenide (AlAs).

4. An optical modulator in accordance with claim 2 wherein the multiple quantum well structure comprises alternating layers of semiconductor materials with alternating predetermined bandgap energy levels thereby forming alternating quantum wells and quantum barriers, the quantum wells and barriers being formed of predetermined semiconductor materials and having predetermined thicknesses such that at zero electric field, the confined electron levels in the quantum wells are near in energy to the X-valley of the quantum barriers.

5. An optical modulator in accordance with claim 2, wherein the multiple quantum well structure is a self electro-optic effect device.

6. An optical modulator in accordance with claim 2, wherein the Fermi level of the multiple quantum well structure is pinned at approximately 0.7 eV and the Fermi level of the at least one semiconductor layer is pinned at approximately 0 eV.

* * * * *